United States Patent
Kim et al.

(10) Patent No.: US 7,074,467 B2
(45) Date of Patent: Jul. 11, 2006

(54) HEAT-SHRINKABLE POLYESTER FILM HAVING EXCELLENT CRYSTALLINITY

(75) Inventors: Sang-pil Kim, Kyungsangbuk-do (KR); Byung-sik Park, Kyungsangbuk-do (KR); Gi-Jeong Moon, Daegu-si (KR); Sang-Duk Oh, Kyungsangbuk-do (KR); Jung-Won Kim, Kyungsangbuk-do (KR)

(73) Assignee: Toray Saehan Inc., Kyungsangbuk-do (KR)

( * ) Notice: Subject to any disclaimer, the term of this patent is extended or adjusted under 35 U.S.C. 154(b) by 0 days.

(21) Appl. No.: 10/874,745

(22) Filed: Jun. 24, 2004

(65) Prior Publication Data

US 2005/0048301 A1 Mar. 3, 2005

(30) Foreign Application Priority Data

Jun. 25, 2003 (KR) .................. 10-2003-0041414

(51) Int. Cl.
- C08G 63/12 (2006.01)
- C08G 63/16 (2006.01)
- C08G 63/18 (2006.01)
- C08G 63/181 (2006.01)
- C08G 63/183 (2006.01)

(52) U.S. Cl. .................. 428/35.1; 528/308; 528/308.6; 528/308.7; 428/34.9; 428/480; 428/910; 525/437; 525/444

(58) Field of Classification Search ............... 428/34.9, 428/35.1, 480, 910; 525/437, 444; 528/302, 528/305, 307, 308, 308.1, 386.6
See application file for complete search history.

(56) References Cited

U.S. PATENT DOCUMENTS

| | | | |
|---|---|---|---|
| 4,985,538 A * | 1/1991 | Fukuda et al. | 528/305 |
| 5,070,180 A * | 12/1991 | Fukuda et al. | 528/272 |
| 5,340,624 A * | 8/1994 | Sublett | 428/35.8 |
| 5,985,387 A * | 11/1999 | Mori et al. | 428/34.9 |
| 6,599,994 B1 * | 7/2003 | Shelby et al. | 525/444 |
| 2001/0014729 A1 * | 8/2001 | Hayakawa et al. | 528/272 |
| 2002/0090502 A1 * | 7/2002 | Ito et al. | 428/304.4 |
| 2003/0050430 A1 * | 3/2003 | Ito et al. | 528/272 |
| 2005/0010018 A1 * | 1/2005 | Kim et al. | 528/307 |

FOREIGN PATENT DOCUMENTS

JP 03-068635 * 3/1991

* cited by examiner

*Primary Examiner*—Vivian Chen
(74) *Attorney, Agent, or Firm*—Arent Fox PLLC

(57) ABSTRACT

Disclosed herein is a heat-shrinkable co-polyester film containing terephthalic acid or dimethyl terephthalate as a dicarbonic acid component, and ethylene glycol, neopentyl glycol and propylene glycol as diol components, in which the co-polyester film has a crystallization temperature of 80–220° C., and a heat shrinkage (%) higher than 30% in at least one direction of longitudinal and transverse directions in 90° C. hot water. This film is suitable for use as various wrapping materials, such as covering, binding and casing materials. Particularly, this film is used to cover a cap, body and shoulder, etc. of various vessels and rod-shaped molded articles and thus to provide labeling, protection, binding or an improvement in product value. Also, this film can be used for multi-package.

4 Claims, 1 Drawing Sheet

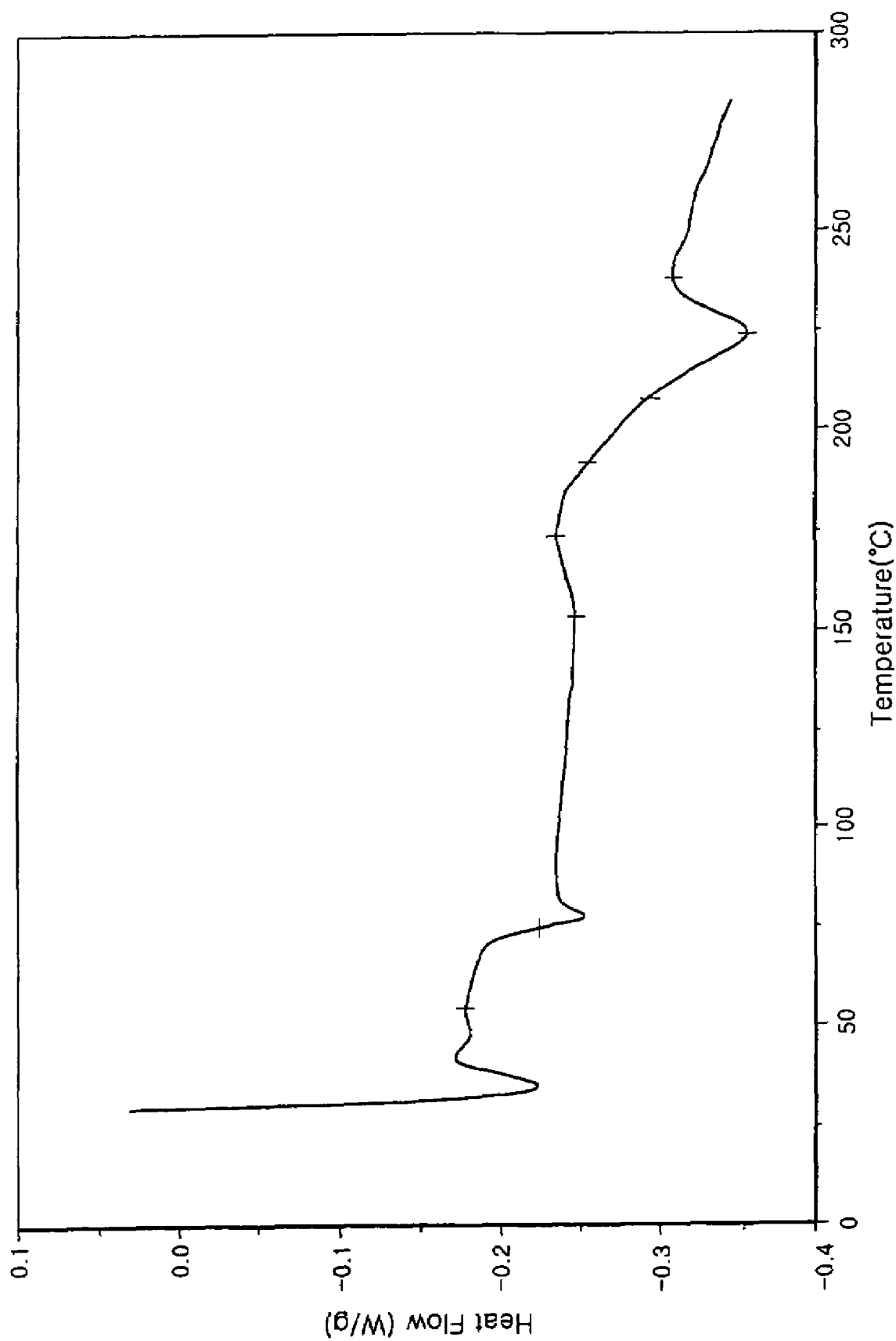

HEAT-SHRINKABLE POLYESTER FILM HAVING EXCELLENT CRYSTALLINITY

BACKGROUND OF THE INVENTION

1. Field of the Invention

The present invention relates to a heat-shrinkable polyester film having excellent crystallinity, which can overcome the problems according to pre-crystallization occurring at a neopentyl glycol content larger than 25 mol %, the product and process problems caused by thermal decomposition occurring upon recycling, and various problems according to aging occurring upon long-term storage.

2. Background of the Related Art

Generally, a heat-shrinkable film is used for the covering, binding or casing of vessels, plastic bottles, glass bottles, and various rod-shaped molded parts, such as pipes, rods and woods, and particularly, used to cover a cap, body and shoulder, etc. of such articles and thus to provide labeling, protection, binding or an improvement in product value. Moreover, this is widely used for the multi-package of products, such as boxes, bottles, sheets, rods and notes, etc., and expected to find use in various applications in view of its shrinkability and shrinkage stress.

In the prior art, a heat-shrinkable film of polyvinyl chloride, polystyrene or polypropylene, etc. was covered on the vessels in a tube shape, multi-packaged and thermally shrunk. However, such a heat-shrinkable film is disadvantageous in that it has insufficient heat resistance, chemical resistance and weather resistance and thus tends to melt or tear upon boiling or retort treatment.

Particularly, the heat-shrinkable film of polyvinyl chloride produces dioxins upon incineration to cause an environmental problem. The heat-shrinkable film of polystyrene has high natural shrinkage (%) and thus the problem of a change in its dimension after storage and printing. For this reason, a heat-shrinkable polyester film has been highlighted.

In the prior art regarding the heat-shrinkable polyester film, Korean patent laid-open publication No. 2001-11259 discloses a method of producing a co-polyester film by blending polyethylene terephthalate, polytrimethylene terephthalate and neopentyl glycol co-polyester. However, this heat-shrinkable polyester film has several problems as follows. First, if the neopentyl glycol co-polyester contains neopentyl glycol at an amount larger than 25 mol %, this will be difficult to be pre-crystallized. The second problem is that this heat-shrinkable polyester film is thermally decomposed upon its recycling to cause a process problem, since it has a far lower melting temperature than the polyethylene terephthalate film. The third problem is that this heat-shrinkable film is aged upon long-term storage, since it has non-crystallinity unlike a heat-shrinkable polyester film of the present invention.

SUMMARY OF THE INVENTION

Accordingly, an object of the present invention is to provide a heat-shrinkable polyester film, which can overcome the problems according to pre-crystallization occurring at a neopentylglycol content larger than 25 mol %, the product and process problems caused by thermal decomposition occurring upon recycling, and various problems according to aging occurring upon long-term storage.

To achieve the above object, the present invention provides a heat-shrinkable co-polyester film containing terephthalic acid or dimethyl terephthalate as a dicarbonic acid component, and ethylene glycol, neopentyl glycol and propylene glycol as diol components, in which the co-polyester film has a crystallization temperature of 80–220° C., and a heat shrinkage (%) higher than 30% in at least one direction of longitudinal and transverse directions in 90° C. hot water.

When the heat-shrinkable polyester film according to the present invention is used for the covering or labeling of vessels, it has no defects, such as end folding, shrinkage marks, post-shrinkage folding, distortion, and end lifting, owing to its reduced shrinkage rate.

BRIEF DESCRIPTION OF THE DRAWINGS

FIG. 1 shows the result of differential scanning calorimetry (DSC) for a heat-shrinkable polyester film produced in Example 1.

DETAILED DESCRIPTION OF THE PREFERRED EMBODIMENT

The present invention provides a heat-shrinkable co-polyester film containing terephthalic acid or dimethyl terephthalate as a dicarbonic acid component, and ethylene glycol, neopentyl glycol and propylene glycol as diol components. The co-polyester film has a crystallization temperature of 80–220° C., and a heat shrinkage (%) higher than 30% in at least one direction of longitudinal and transverse directions in 90° C. hot water.

In producing the heat-shrinkable co-polyester film according to the present invention, a neopentyl glycol co-polyester composition, which comprises neopentylglycol co-polyester containing more than 25 mol % of neopentylglycol, and polyethylene terephthalate and polytrimethylene terephthalate, is melted and extruded by means of a twin-screw extruder capable of melting and extruding the raw materials with the removal of water in high vacuum levels. The extruded material is cooled and solidified to produce a sheet, which is then drawn in either direction of longitudinal and transverse directions or drawn in both directions at a suitable drawing ratio, thereby producing the heat-shrinkable polyester film having excellent crystallinity.

The polyester film produced according to this producing method has an advantage in view of production costs, since neopentyl glycol co-polyester produced in a batch polymerization process can be used at a reduced amount and inexpensive polyethylene terephthalate produced in a continuous polymerization process can be used at an increased amount. Furthermore, the heat-shrinkable polyester film of the present invention has a high melting temperature of 210–245° C. and thus an advantage in that the production of by-produces caused by thermal decomposition upon its recycling can be further reduced. When polyethylene terephthalate, polytrimethylene terephthalate and neopentylglycol co-polyester are blended for producing a co-polyester film, a new copolymer composition is obtained in which the respective monomers of the raw materials are uniformly mixed. Properties of this copolymer composition vary depending on the arrangement of the respective monomers within a polymer chain. The arrangement of the respective monomers within the polymer chain also has an effect on a recycling process. For the recycling of a heat-shrinkable polyester film produced by the simple blending of polytrimethylene terephthalate, neopentyl glycol co-polyester and polyethylene terephthalate as described in Korean patent laid-open publication No. 2001-11259, the solid film must be melted at high temperature and then formed into a chip shape. However, in this case, since the co-polyester forming the prior heat-shrinkable polyester film has slow crystallization rate, pre-drying must be conducted at low temperature for a considerable time or the twin-screw extruder must be used as in the present invention. However, the heat-shrinkable polyester film according to the present invention is produced from the monomers similar with those of the prior polyester film but shows completely different properties. In other words, according to the present invention, polytrimethylene terephthalate, neopentyl glycol co-polyester containing more than 26 mol % of neopentyl glycol, and polyethylene terephthalate are introduced into a twin-screw extruder without pre-drying while adjusting their inputs to a suitable mixing ratio in the respective raw material feeders. The introduced raw materials are melted by the twin-screw extruder and formed into a cooled sheet from which the heat-shrinkable polyester film is then produced. The heat-shrinkable polyester film produced as described above has a crystallization rate faster than the polyester film produced according to the prior art and thus more easily pre-dried. Moreover, crystalline polymer generally has excellent thermal stability as compared to non-crystalline polymer. The heat-shrinkable polyester film of the present invention shows the crystallization peak in a differential scanning calorimeter (DSC) whereas the prior heat-shrinkable polyester film does not show the crystallization peak in the same condition. Owing to this difference in crystallinity, the heat-shrinkable polyester film of the present invention has no problems according to aging even upon long-term storage.

More specifically, the present invention relates to a heat-shrinkable co-polyester film containing terephthalic acid or dimethyl terephthalate as a dicarbonic acid component, and ethylene glycol, neopentyl glycol and propylene glycol as diol components. This co-polyester film has a crystallization temperature of 80–220° C., and a heat shrinkage (%) higher than 30% in at least one direction of longitudinal and transverse directions in 90° C. hot water. Preferably, the neopentyl glycol co-polyester composition used for producing the heat-shrinkable co-polyester film contains more than 90 mol % of dimethyl terephthalate or terephthalic acid as a dicarbonic acid, 30–74 mol % of ethylene glycol, 26–60 mol % of neopentyl glycol, and 0–10 mol % of other components, as diol components, and has an intrinsic viscosity (I.V.) of 0.50–0.80 dl/g. Preferably, the polytrimethylene terephthalate used in the present invention has an intrinsic viscosity (I.V.) higher than 0.96 dl/g.

In order to examine the thermal properties of the heat-shrinkable co-polyester film according to the present invention, this co-polyester film was heated from 25° C. to 280° C. at a rate of 10° C./minute with a differential scanning calorimeter (DSC) to erase all the heat history of the co-polyester film, and then quenched to room temperature. The co-polyester film was heated again from 25° C. to 280° C. at a rate of 10° C./minute, and at the same time, analyzed for its intrinsic thermal properties. In this case, the heat-shrinkable polyester film has a crystallization temperature (Tc) of 80–220° C., and preferably 100–200° C. If the crystallization temperature is below 80° C., the low temperature shrinkage (%) of the resulting heat-shrinkable polyester film will be reduced. If the crystallization temperature is above 220° C., the crystallization rate of the resulting film will be slow.

The heat-shrinkable co-polyester film according to the present invention must have a heat shrinkage (%) higher than 30% in either direction of longitudinal and transverse directions in 90° C. hot water. If the heat shrinkage (%) is lower than 30%, the covering material will be often loosen upon the covering of vessels due to too low shrinkage.

The neopentyl glycol co-polyester composition used in the present invention contains more than 90 mol % of dimethyl terephthalate or terephthalic acid as a dicarbonic acid, 30–74 mol % of ethylene glycol, 26–60 mol % of neopentyl glycol, and 0–10 mol % of other diol components, as diol components.

The neopentylglycol co-polyester composition used in the present invention contains more than 90 mol % of dimethyl terephthalate or terephthalic acid as a dicarbonic acid component, and 0–10 mol % of at least one component selected from the group consisting of isophthalic acid, 2,6-napthalenedicarboxylic acid, sebacic acid, adipic acid, diphenyl-dicarboxylic acid, 5-tert-butyl isophtalic acid, 2,2,6,6-tetramethyldiphenyl-4,4'-dicarbonic acid, 1,1,3-trimethyl-3-phenylindan-4,5-dicarbonic acid, 5-sodium sulfoisophthalic acid, trimellitic acid, oxalic acid, malonic acid, succinic acid, glutaric acid, pimeric acid, azelaic acid, pyromellitic acid, 1,4-cyclohexane dicarboxylic acid, 1,3-cyclohexane dicarboxylic acid and an ester compound thereof. Also, it contains 30–74 mol % of ethylene glycol, 26–60 mol % of neopentyl glycol and 0–10 mol % of other components, as diol components. As the other diol components, there can be used one or more components selected from diethylene glycol, triethylene glycol, hexanediol, petanediol, diols of 2,2-(4-oxyphenol)propane derivatives, xylene glycol, butanediol, 1,3-cyclohexanedimethanol, 2,2-bis-(4-hydroxyphenyl)propane, bis(4-hydroxyphenyl)sulfone, polytetramethylene glycol, polyethylene glycol, and 2-methyl-1,3-propanediol.

The neopentyl glycol co-polyester composition must contain more than 90 mol % of dimethyl terephthalate or terephthalic acid as a dicarbonic acid in order to produce a co-polyester film having excellent mechanical properties. Moreover, among the diol components, neopentyl glycol is preferably used at the amount of 26–60 mol %. This is because the use of a neopentyl glycol co-polyester having the highest possible content of neopentyl glycol is advantageous in view of production costs, but the use of a neopentyl glycol co-polyester having the too low content of neopentyl glycol does not allow the production of a heat-shrinkable polyester film having crystallinity, a characteristic of the present invention. Namely, the heat-shrinkable polyester film having crystallinity can be produced if neopentyl glycol co-polyester having a neopentyl glycol content higher than 26 mol %, polyethylene terephthalate and polytrimethylene terephthalate are blended in the twin-screw extruder while removing water in high vacuum levels. However, if the neopentyl glycol co-polyester has a neopentyl glycol content higher than 60 mol %, it can not show a sufficient blending effect. Furthermore, the neopentyl glycol co-polyester composition used in the present invention preferably contains about 0–10 mol % of the other diol components. If the content of the other diol components exceeds about 10 mol %, there is a risk that the necessary properties of the resulting heat-shrinkable polyester film can be remarkably changed. Thus, the neopentyl glycol co-polyester composition preferably contains less than 10 mol % of the other diol components for a special function, i.e., for the purpose of preventing the breakage of a label caused by end lifting, reductions in natural shrinkage or impact. Most of general heat-shrinkable polyester films preferably contain the other diol components as described above at the lowest possible amount, because the use of large amounts of the other diol components are generally disadvantageous in view of processes and production costs.

In addition to the components as described above, the heat-shrinkable polyester film according to the present invention may also contain other comonomers as long as they do not affect the characteristics of the polyester film.

The appropriate control of the intrinsic viscosities (I.V.) of neopentyl glycol co-polyester and polytrimethylene terephthalate used in the present invention is critical to the present invention. For use in the present invention, neopentyl glycol co-polyester preferably has an intrinsic viscosity (I.V.) of 0.50–0.80 dl/g, and polytrimethylene terephthalate preferably has an intrinsic viscosity (I.V.) higher than 0.96 dl/g. If neopentyl glycol co-polyester has an intrinsic viscosity lower than 0.50 dl/g, its processibility into a heat-shrinkable polyester film can be too deteriorated. Namely, due to this too low intrinsic viscosity (I.V.), the resulting chip itself is too weak and thus brittle to produce large amounts of dusts, its formation into a cooled sheet can be difficult, and it can occur large amounts of oligomers in a sheet-forming process and a drawing process. If neopentyl glycol co-polyester has an intrinsic viscosity (I.V.) exceeding 0.80 dl/g, it is disadvantageous in view of physical properties and production costs. Namely, for an increase in intrinsic viscosity (I.V.) of this substance, polymerization must be continuously conducted, but after a certain time, thermal decomposition occurs together with the polymerization, so that the production of oligomers is gradually increased and the resulting substance can be discolored yellow. Polytrimethylene terephthalate preferably has an intrinsic viscosity (I.V) higher than 0.96 dl/g. If the polytrimethylene terephthalate has an intrinsic viscosity (I.V) lower than 0.96 dl/g, this will be difficult to be formed into a sheet due to its thermal decomposition occurring in a melting-extrusion process. The polyethylene terephthalate is known as being thermally decomposed faster than polyester in the melting-extrusion process.

The neopentyl glycol co-polyester which is used in the practice of the present invention can be produced according to the conventional method for the production of polyester. For example, the neopentyl glycol co-polyester can be produced by the direct esterification of terephthalic acid with ethylene glycol and neopentyl glycol, the ester interchange of dimethylterephthalate with ethylene glycol and neopentyl glycol, and the blending of polyneopentyl terephthalate with polyethylene terephthalate.

If necessary, the heat-shrinkable polyester film according to the present invention may contain a lubricant, such as titanium dioxide, silica, kaolin, calcium carbonate, alumina, zicornia and organic particles, and also a thermal stabilizer, an antioxidant, a peening improver, an UV-blocking agent, an antibiotic agent, an antistatic agent, and a flame retardant, etc.

The present invention will hereinafter be described in further detail by examples and comparative examples. It should however be borne in mind that the present invention is not limited to or by the examples. Moreover, properties of films produced in examples and comparative examples were evaluated according to the following method.

(1) Heat Shrinkage (%)

A heat-shrinkable film was sampled by cutting into a square which is 100 mm in length and 100 mm in width. The sample was thermally treated in 90° C. hot water for 10 seconds and measured for its shrinkage (%). The thermal treatment and measurement were repeated 20 times, and an average of the measured values was defined as heat shrinkage (%). The heat shrinkage (%) was calculated according to the following equation.

$$\text{Shrinkage (\%)} = \frac{(100-L)}{100} \times 100$$

wherein L is the length (mm) of the sample after the thermal treatment.

(2) Melting Temperature (1st Tm)

About 5 mg of the sample was cut, put in a sample pen, sealed with a press, and then inserted in a sample tray. The maximum of an endothermic peak appearing when heating the sample from 25° C. to 280° C. at a rate of 10° C./minute with a differential scanning calorimeter (DSC) manufactured by Texas Instruments, Inc. was taken as melting temperature.

(3) Crystallization Temperature (2nd Tc)

About 5 mg of the sample was cut, put in a sample pen, sealed with a press, and then inserted in a sample tray. The sample was heated from 25° C. to 280° C. at a rate of 10° C./minute with a differential scanning calorimeter (DSC) manufactured by Texas Instruments, Inc. to erase all the heat history of the heat-shrinkable co-polyester film, and then quenched to room temperature. The maximum of an exothermic peak appearing when re-heating the sample from 25° C. to 280° C. at a rate of 10° C./minute was taken as crystallization temperature.

(4) Intrinsic Viscosity (I.V.)

The sample was completely dissolved in an orthochlorophenol (OCP) solvent to a concentration of 0.0596 wt %, and then measured for its intrinsic viscosity at 25° C. with an autoviscometer (Canon viscometer) manufactured by Design Scientific, Co.

(5) Aging Shrinkage (%)

A heat-shrinkable film was sampled by cutting into a square which is 100 mm in length and 100 mm in width. The sample was left to stand at 40° C. and 60% humidity for 7 days, and then measured for its aging shrinkage (%).

SYNTHETIC EXAMPLE 1

2,000 kg of dimethyl terephthalate and 1,278 kg of ethylene glycol were introduced into a reaction tube, and then manganese acetate was added at the amount of 0.08 wt % relative to the amount of dimethyl terephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethyl terephthalate. After 5 minutes, antimony trioxide was added at the amount of 0.03 wt % relative to the amount of dimethyl terephthalate and then continued to stir for 5 minutes. After the oligomeric mixture was transferred to another reactor equipped with a vacuum system, its temperature was elevated from 250° C. to 280° C., thereby obtaining polyethylene terephthalate (PET) having an intrinsic viscosity of 0.6 dl/g.

SYNTHETIC EXAMPLE 2

1,000 kg of dimethyl terephthalate, 447 kg of ethylene glycol and 322 kg of neopentylglycol were introduced into a reaction tube, and then manganese acetate was added at the amount of 0.08 wt % relative to the amount of dimethyl terephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethyl terephthalate. After 5 minutes, antimony trioxide was added at the amount of 0.03 wt % relative to the amount of dimethyl terephthalate and then continued to stir for 5 minutes. After the oligomeric mixture was transferred to another reactor equipped with a vacuum system, its temperature was elevated from 250° C. to 280° C., thereby obtaining neopentyl glycol co-polyester (A) which has an intrinsic viscosity (I.V.) of 0.7 dl/g and in which neopentyl-glycol forms 40 mol % of the total diols.

SYNTHETIC EXAMPLE 3

1,000 kg of dimethyl terephthalate, 553 kg of ethylene glycol and 145 kg of neopentyl glycol were introduced into a reaction tube, and then manganese acetate was added at the amount of 0.08 wt % relative to the amount of dimethyl terephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethyl terephthalate. After 5 minutes, antimony trioxide was added at the amount of 0.03 wt % relative to the amount of dimethyl terephthalate and then continued to stir for 5 minutes. After the oligomeric mixture was transferred to another reactor equipped with a vacuum system, its temperature was elevated from 250° C. to 280° C., thereby obtaining neopentyl glycol co-polyester (B) which has an intrinsic viscosity (I.V.) of 0.6 dl/g and in which neopentylglycol forms 18 mol % of the total diols.

SYNTHETIC EXAMPLE 4

2,000 kg of dimethyl terephthalate and 1,568 kg of 1,3-propanediol were introduced into a reaction tube, and then manganese acetate was added at the amount of 0.08 wt % relative to the amount of dimethyl terephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethyl terephthalate. After 5 minutes, antimony trioxide was added at the amount of 0.04 wt % relative to the amount of dimethyl terephthalate, and after 10 minutes, tetrabutyl titanate was added at the amount of 0.005 wt % relative to the amount of dimethyl terephthalate and then the mixture was continued to stir for 5 minutes. After the oligomeric mixture was transferred to another reactor equipped with a vacuum system, its temperature was elevated from 250° C. to 280° C., thereby obtaining polyethylene terephthalate (PTT) having an intrinsic viscosity of 1.0 dl/g.

EXAMPLE 1

Polyethylene terephthalate (PET), polytrimethylene terephthalate (PTT), and neopentyl glycol co-polyester (A) containing 30 mol % of 1,4-cyclohexanedimethanol were introduced into the respective raw material feeders. Then, while adjusting the inputs of the raw materials with the respective feeders in such a manner that the polyethylene terephthalate (PET) is 52.2 wt %, the polytrimethylene terephthalate (PTT) is 12.4 wt % and the neopentyl glycol co-polyester (A) is 35.4 wt %, these raw materials were continuously introduced into a twin-screw extruder capable of melting and extruding the raw materials with the removal of water in high vacuum levels. The resulting sheet melted and extruded through the twin-screw extruder and T-die was solidified on a chill casting roll. The solidified sheet was preheated to 90–110° C., and drawn to 3.5 times in a transverse direction at 80–100° C., thereby producing a heat-shrinkable polyester film having a thickness of 50 µm.

EXAMPLE 2

Polyethylene terephthalate (PET), polytrimethylene terephthalate (PTT), and neopentyl glycol co-polyester (A) were introduced into the respective raw material feeders. Then, while adjusting the inputs of the raw materials with the respective feeders in such a manner that the polyethylene terephthalate (PET) is 47 wt %, the polytrimethylene terephthalate (PTT) is 11 wt % and the neopentylglycol co-polyester (A) is 42 wt %, these raw materials were continuously introduced into a twin-screw extruder capable of melting and extruding the raw materials with the removal of water in high vacuum levels. The resulting sheet melted and extruded through the twin-screw extruder and T-die was solidified on a chill casting roll. The solidified sheet was preheated to 90–110° C., and drawn to 4.0 times in a transverse direction at 80–100° C., thereby producing a heat-shrinkable polyester film having a thickness of 50 µm.

COMPARATIVE EXAMPLE

Polytrimethylene terephthalate (PTT) and neopentylglycol co-polyester (B) were pre-crystallized, and then introduced into a rotary vacuum drier in such a manner that the polytrimethylene terephthalate (PTT) is 11 wt % and the neopentylglycol co-polyester (B) is 89 wt %. The dried mixture was melted and extruded through a single-screw extruder, and the resulting sheet was solidified on a chill casting roll. The solidified sheet was preheated to 90–110° C., and drawn to 4.0 times in a transverse direction at 80–100° C., thereby producing a heat-shrinkable polyester film having a thickness of 50 µm.

The measured properties of the films produced by Examples and Comparative Examples are given in Table 1 below.

TABLE 1

| Properties | | Example 1 | Example 2 | Comparative Example |
|---|---|---|---|---|
| Heat shrinkage (%) | Longitudinal direction | 2 | 2 | 3 |
| | Transverse direction | 60 | 50 | 50 |
| 1st Tm (° C.) | | 242 | 242 | 204 |
| 2nd Tc (° C.) | | 173 | 178 | — |
| Aging shrinkage (%) | | 0.3 | 0.3 | 1.0 |

Furthermore, FIG. 1 shows the result of differential scanning calorimetry (DSC) for the-heat-shrinkable polyester film produced by Example 1.

As described above, the present invention provides the heat-shrinkable co-polyester film containing terephthalic acid or dimethyl terephthalate as a dicarbonic acid component, and ethylene glycol, neopentyl glycol and propylene glycol as diol components, in which the co-polyester film has a crystallization temperature of 80–220° C., a heat shrinkage (%) higher than 30% in at least one direction of longitudinal and transverse directions in 90° C. hot water. This heat-shrinkable polyester film can be produced without the pre-crystallization of neopentyl glycol co-polyester. Moreover, this heat-shrinkable polyester film shows reduced thermal decomposition upon its recycling and exhibits insignificant aging even upon long-term storage. In addition, this heat-shrinkable polyester film is greatly advantageous in view of production costs.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A heat-shrinkable co-polyester film containing dimethyl terephthalate as a dicarbonic acid component, and ethylene glycol, neopentyl glycol and propylene glycol as diol components, in which the co-polyester film has a crystallization temperature of 80–220° C., and a heat shrinkage (%) higher than 30% in at least one direction of longitudinal and transverse directions in 90° C. hot water.

2. The heat-shrinkable co-polyester film of claim 1, which is produced by a method comprising the steps of: melting and extruding a co-polyester composition comprising dimethyl terephthalate as a dicarbonic acid component, and ethylene glycol, neopentyl glycol, and propylene glycol as diol components, through a twin-screw extrude, while removing water by vacuum; cooling and solidifying the extruded material to produce a sheet; and drawing the sheet.

3. The heat-shrinkable co-polyester film of claim 2, wherein the co-polyester composition contains more than 90 mol % of dimethyl terephthalate or as a dicarbonic acid component, 30–74 mol % of ethylene glycol, 26–60 mol % of neopentyl glycol, and 0–10 mol % of propylene glycol, as diol components, and has an intrinsic viscosity (I.V.) of 0.50–0.80 dl/g.

4. A heat-shrinkable co-polyester film prepared by mixing polyethylene terephthalate (PET) synthesized from dimethyl terephthalate as a dicarbonic acid component and ethylene glycol as a (diol component; neopentyl glycol co-polyester which contains more than 90 mol % of dimethyl terephthalate as a dicarbonic acid component, 30–74 mol % of ethylene glycol, 26–60 mol % of neopentyl glycol and 0–10 mol % of propylene glycol as a diol component; and polytrimethylene terephthalate (PTT) synthesized from dimethyl terephthalate as a dicarbonic acid component and 1,3-propanediol as a diol component; in which the co-polyester film has a crystallization temperature of 80–220° C., and a heat shrinkage (%) higher than 30% in at least one direction of longitudinal and transverse directions in 90° C. hot water.

* * * * *